ELECTRICAL HYBRID RING NETWORK

Filed March 5, 1953 4 Sheets-Sheet 1

$Y_c = \frac{Y_0}{\sqrt{2k}}$

INVENTORS
WALTER V. TYMINSKI
ALBERT E. HYLAS
BY Darby & Darby
ATTORNEYS

Feb. 21, 1956 A. E. HYLAS ET AL 2,735,986

ELECTRICAL HYBRID RING NETWORK

Filed March 5, 1953 4 Sheets-Sheet 2

INVENTORS
WALTER V. TYMINSKI
ALBERT E. HYLAS
BY Darby & Darby
ATTORNEYS

Feb. 21, 1956 A. E. HYLAS ET AL 2,735,986

ELECTRICAL HYBRID RING NETWORK

Filed March 5, 1953 4 Sheets-Sheet 3

INVENTORS
WALTER V. TYMINSKI
ALBERT E. HYLAS
BY Darby & Darby
ATTORNEYS

Feb. 21, 1956 A. E. HYLAS ET AL 2,735,986

ELECTRICAL HYBRID RING NETWORK

Filed March 5, 1953 4 Sheets-Sheet 4

INVENTORS
WALTER V. TYMINSKI
ALBERT E. HYLAS
BY Darby & Darby
ATTORNEYS

United States Patent Office 2,735,986

Patented Feb. 21, 1956

2,735,986

ELECTRICAL HYBRID RING NETWORK

Albert E. Hylas, Clifton, and Walter V. Tyminski, Nutley, N. J., assignors to Allen B. Du Mont Laboratories, Inc., Clifton, N. J., a corporation of Delaware Application March 5, 1953, Serial No. 340,644

2 Claims. (Cl. 333—11)

This invention relates to electrical networks which are used at ultra-high radio frequencies. In particular, it relates to networks of the so-called Magic T type, and to modifications in such networks, for the purpose of increasing the band of frequencies over which a Magic T network is adapted to operate.

The term "Magic T" is generic to a variety of electrical circuits, some of which are discussed in "Microwave Duplexers" by Smullin and Montgomery, vol. 14 of the M. I. T. Radiation Laboratory Series published by McGraw-Hill. Most embodiments of Magic T networks are limited in operation to a relatively narrow band of frequencies and are, therefore, termed "frequency sensitive." However, one embodiment, a hybrid ring, or ring-circuit, type of Magic T which consists of a closed loop of transmission line, may be made to operate over a comparatively wide band of frequencies and is therefore called "frequency insensitive." The length of the line forming the loop is determined by the frequency band of the signal used to energize the loop and is approximately equal to a wavelength, λ, of a particular frequency in the operating band of frequencies. This hybrid ring network is a balanced circuit and is called a $$\frac{6\lambda}{4}$$

network because the one-wavelength loop is divided into four arms, each approximately a quarter wavelength, or $$\frac{\lambda}{4}$$

long. One of the arms comprises a network to invert the polarity of the electrical signal passing therethrough, or as it may be considered, to shift the phase of the signal by 180°. In order to make the complete hybrid ring operable over a wide band of frequencies, the inverting network should be independent of frequency over a wide band. The desired independence of frequency may be accomplished by transposing the two conductors of the chosen arm.

The four pairs of junctions between the arms of a hybrid ring are nominally divided into two pairs of input terminals and two pairs of output terminals, although it is not necessary to use all pairs of terminals at all times. It has been found that the terminating impedances at the output terminal pairs sometimes comprise reactive components which have a particularly deleterious effect on the operation of a wide band ring.

One object of the invention is to provide an improved wide band hybrid ring network.

Another object is to balance out the undesired reactive components of a wide band ring.

Other objects will appear from a study of the following specification together with the drawings in which.

Figure 1:
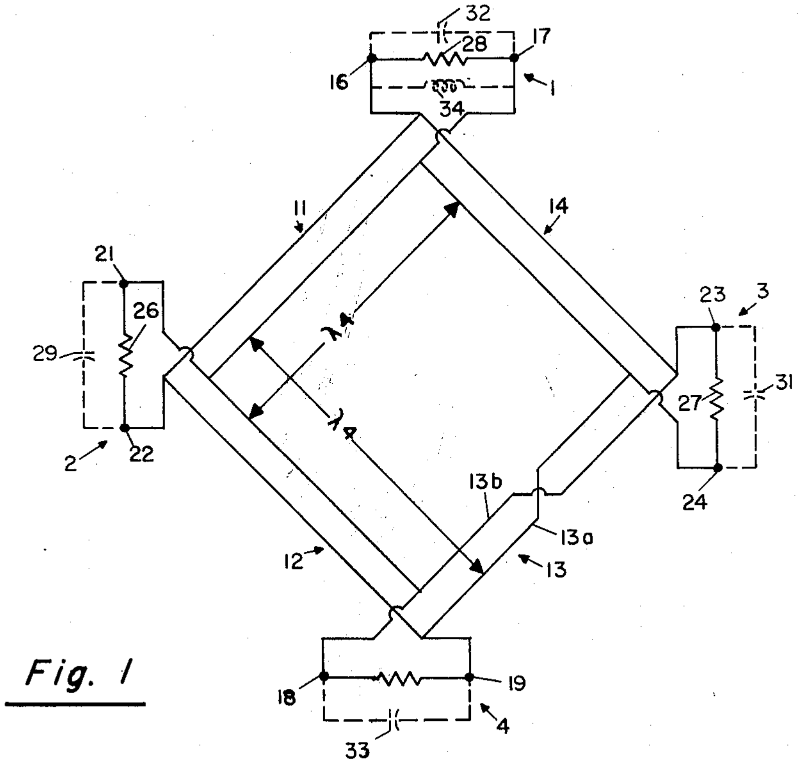
Figure 1 is a schematic diagram of a 6λ/4 wide band hybrid ring.
Figure 4:
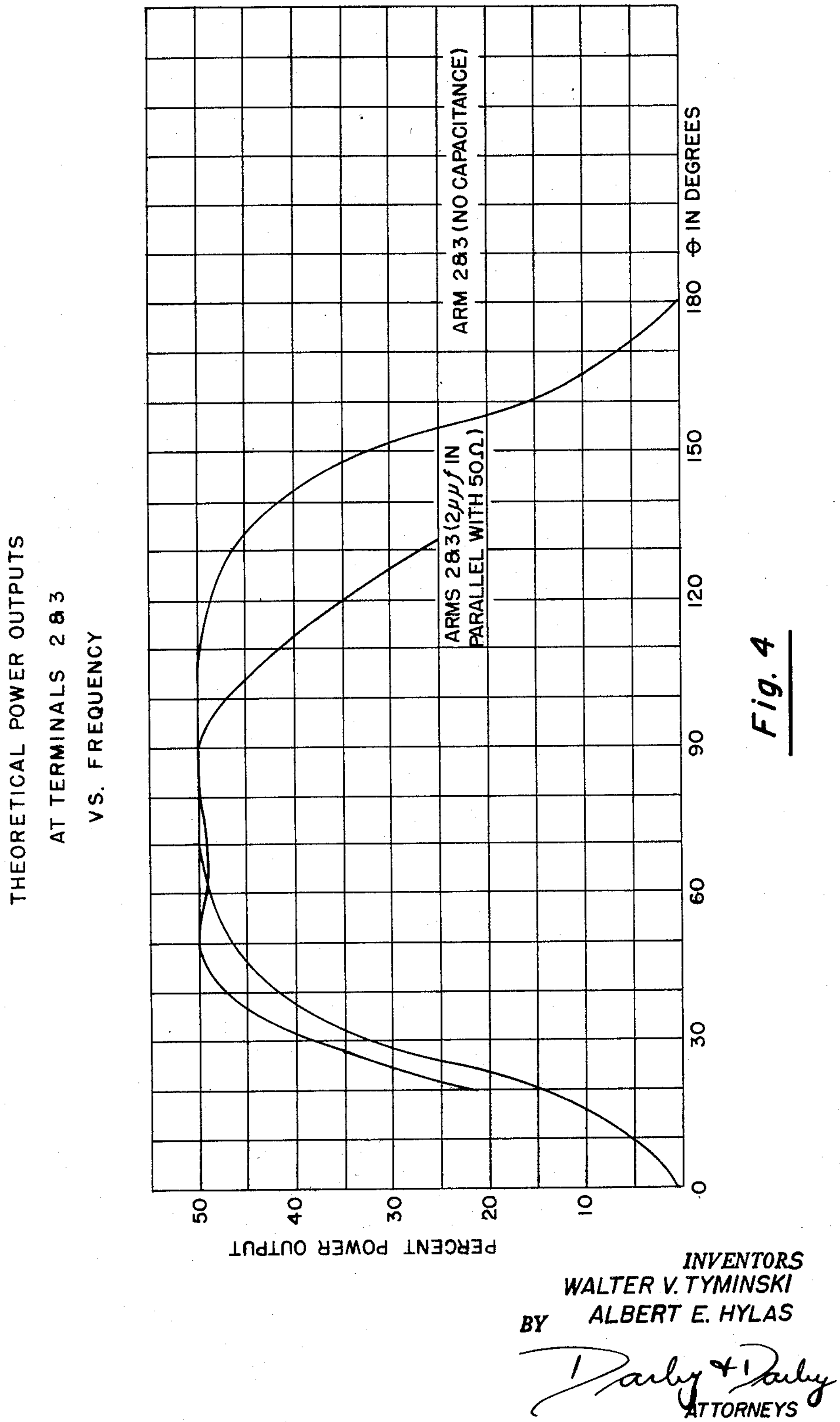

Figure 4 gives the response curves of the ring of Figure 1; and

Figure 3:
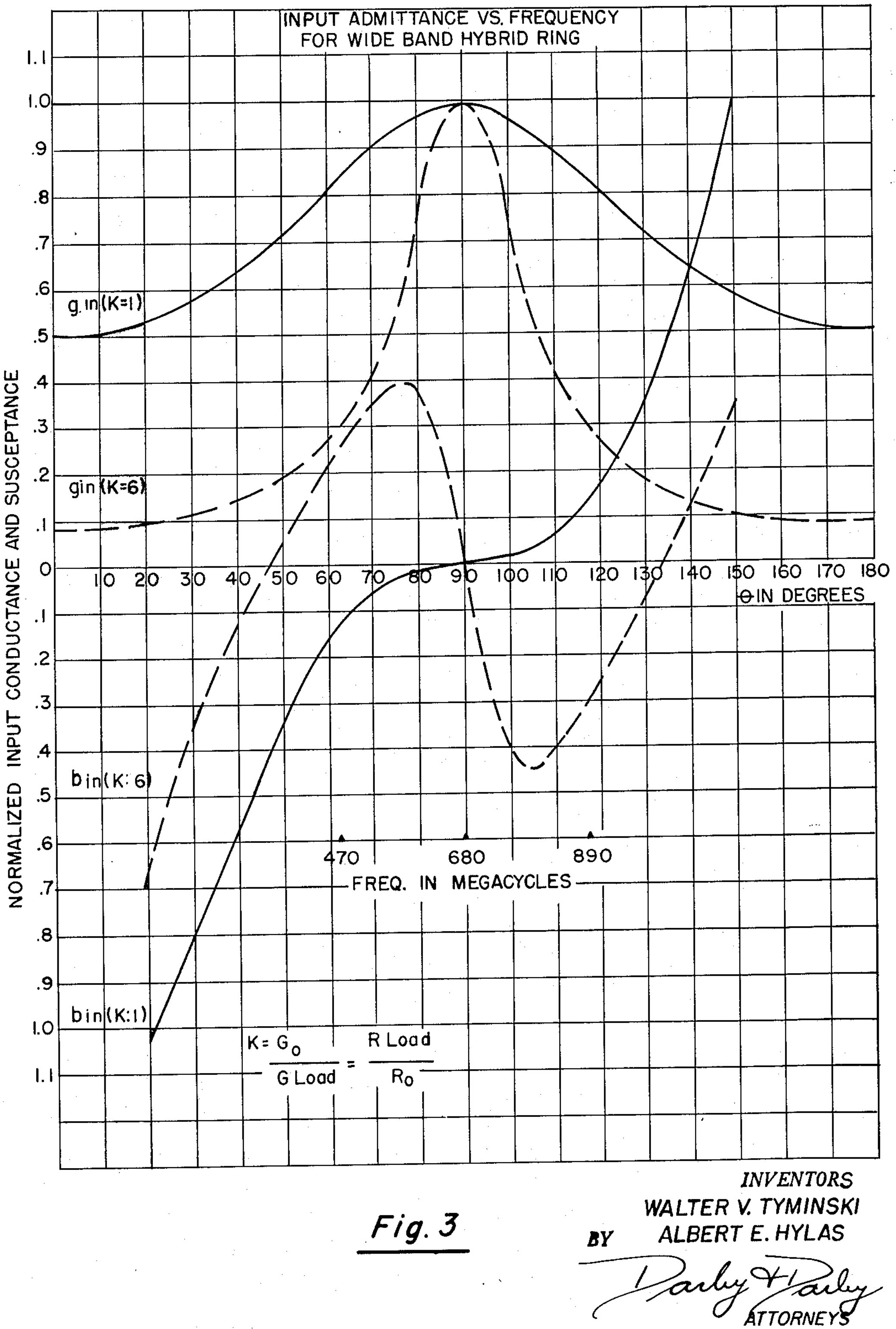
Figure 3 shows reactance and admittance curves of the ring of Figure 1 for purely resistive terminations.
Figure 5:
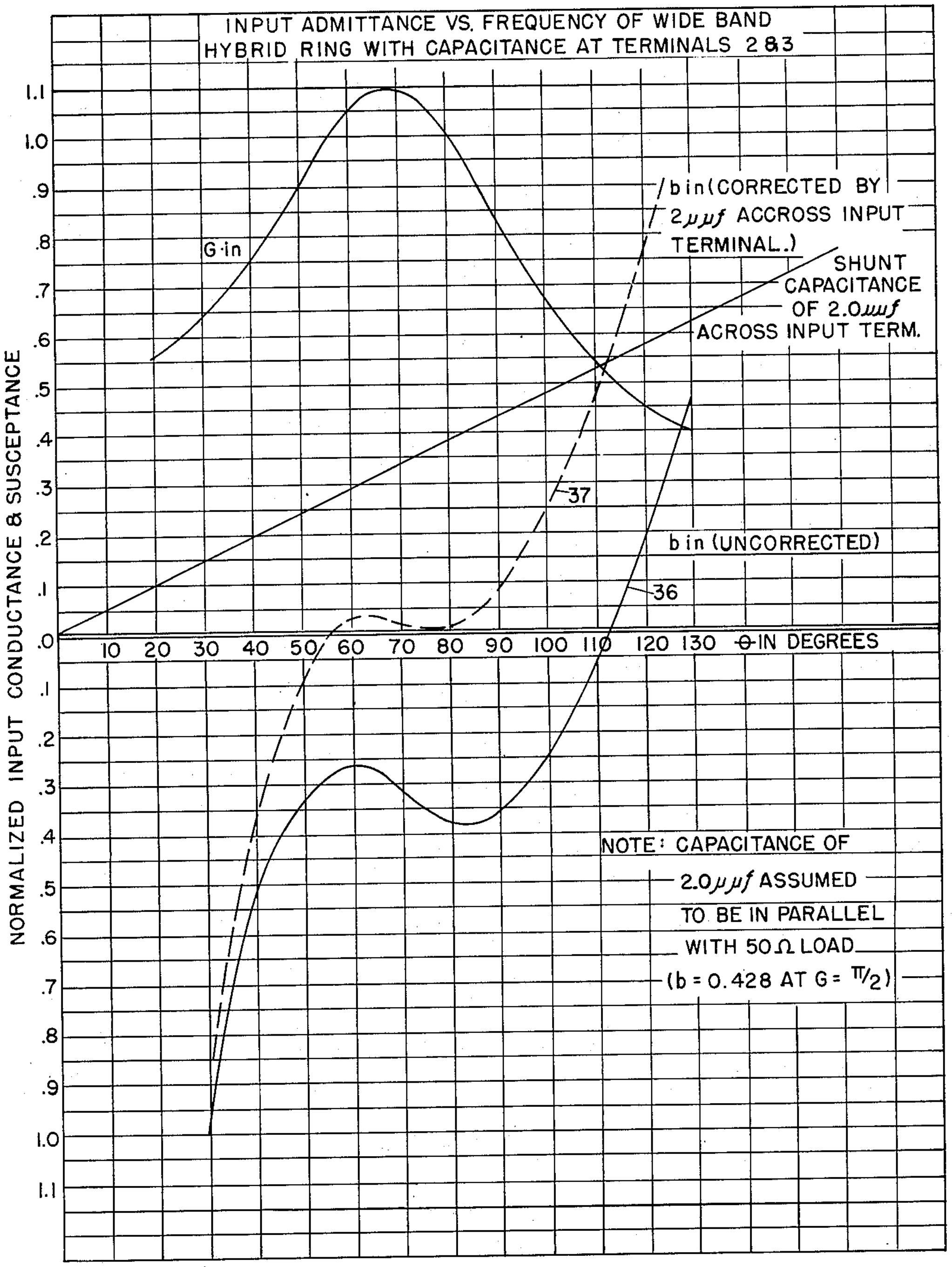

Figure 5 corresponds to Figure 3 and illustrates curves for terminations including reactive components.

One embodiment of the invention comprises a loop of two-conductor transmission line. The two ends of the line are connected to close the loop, but, in making the connection, the two conductors are twisted, or transposed. Four pairs of terminals are spaced at substantially equal distances around the line and the twist, or transposition, is located between two of the pairs of terminals. Alternate pairs of terminals serve as input terminals while the remaining pairs of terminals are output terminals.

As set forth hereinabove, stray capacitance across the output terminals introduces an undesired reactive component into the equivalent impedance of the loop. The capacitive reactance at the output terminals is transformed, by the transmission line forming the loop, into an equivalent inductive reactance at the input terminals. In order to cancel out this equivalent inductive reactance, a capacitor is connected across the input terminals. It has been found advantageous to resonate the added capacitance with the equivalent inductance at certain portions of the operating frequency band, and one preferred condition is that the added capacitance be approximately equal to the capacitance at one of the pairs of output terminals. Other magnitudes for the added capacitance will be determined hereinafter.

Referring now to Figure 1, which illustrates a $$\frac{6\lambda}{4}$$

hybrid ring, it will be seen that four arms 11–14 comprise the ring and that arm 13 includes a transposition of the two conductors 13$a$ and 13$b$. At the junction of arms 11 and 14 is a pair of input terminals 16 and 17, referred to simply as terminal 1 hereinafter. A second pair of input terminals 18 and 19, referred to as terminal 4 hereinafter, is located at the junction of arms 12 and 13. One pair of output terminals 21 and 22, called terminal 2, is formed at the junction of arms 11 and 12; while a second pair of output terminals 23 and 24, called terminal 3, is located at the junction of arms 13 and 14.

In the first analysis of the operation of the ring in Figure 1, only the non-reactive impedances (or conductances) 26, across terminals 21 and 22, and 27, across terminals 23 and 24, will be considered. Conductances 26 and 27 may be the input conductances of resistive loads (not shown) connected to the respective terminal pairs. The output conductance 28 of the signal source (not shown) supplying an electrical signal to the ring is connected across the terminals 16 and 17. Normally, load conductance 26 is equal to conductance 27 unless impedance transformation is provided in the ring or in the connections thereto.

Conductances 26 and 27 are related to the conductance 28 of the source by a factor $k$, and the conductance of the transmission line forming arms 11–14 is a function of $k$ so that the input conductance of the ring will match the source conductance 28 at the design center frequency of the ring.

Figure 2:
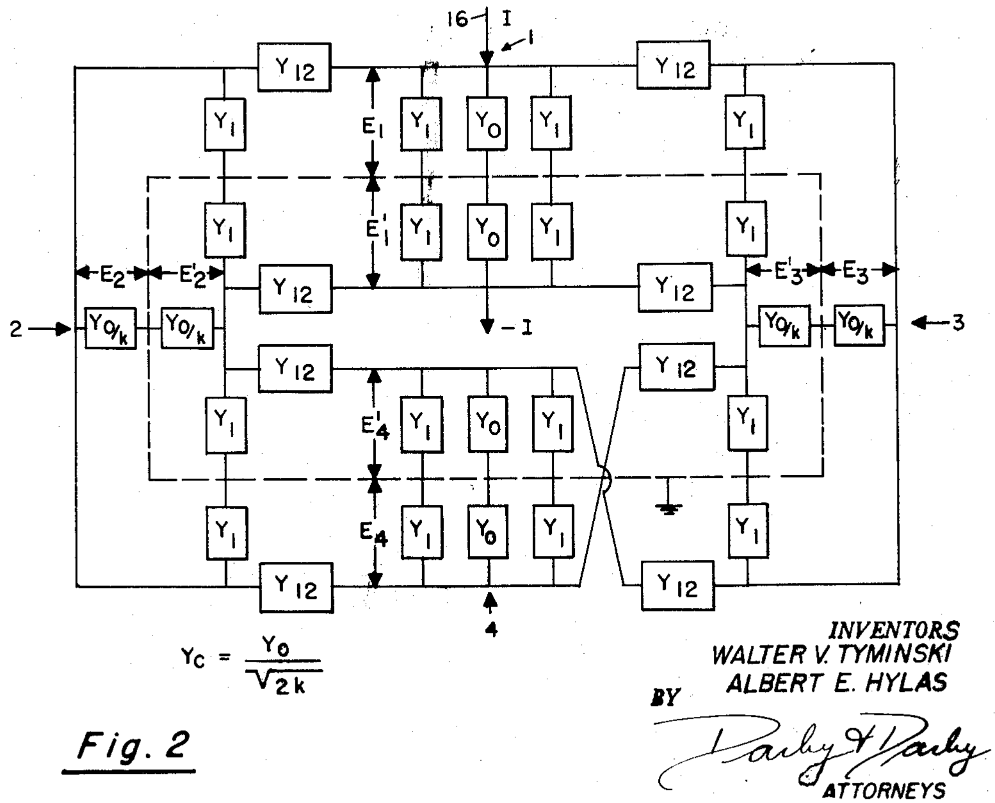
Figure 2 is an elaboration of Figure 1 for mathematical analysis.

Because the equivalent circuit is balanced with respect to ground, only four of the possible eight nodal equations are necessary to describe operation of the ring, and these are obtained by the application of Kirchhoff's laws to the circuit of Figure 2, which is the equivalent of Figure 1. The simultaneous equations are:

$$I=E_1Y_{11}-E_2Y_{12}-E_3Y_{12} \qquad (1)$$

$$0=-E_1Y_{12}+E_2Y_{22}-E_4Y_{12} \qquad (2)$$

$$0=-E_1Y_{12}+E_3Y_{33}+E_4Y_{12} \qquad (3)$$

$$0=-E_2Y_{12}+E_3Y_{12}+E_4Y_{44} \qquad (4)$$

where $$Y_{11}=Y_{44}=Y_0+2Y_1+2Y_{12}$$

$$Y_{22}=Y_{33}=Y_0/k+2Y_1+2Y_{12}$$

and $$Y_1=JY_c\tan\frac{\theta}{2}=J\frac{Y_0}{\sqrt{2k}}\tan\frac{\theta}{2}$$

$$Y_{12}=-J\frac{Y_c}{\sin\theta}=-J\frac{Y_0}{\sqrt{2k}\sin\theta}$$

By solving Equations 1, 2, 3 and 4 for $E_4$ there is obtained the desired result that:

$$E_4=0 \qquad (5)$$

This result is independent of frequency and load conditions at terminals 18 and 19. By substituting 5 in Equation 4 it is also apparent that for all frequencies $$E_2=E_3 \qquad (6)$$

The condition of Equation 5 also simplifies Equations 1, 2, 3 and 4 so that the operation of the circuit may be described by two equations:

$$I=E_1Y_{11}-2E_2Y_{12} \qquad (1a)$$

$$0=-E_1Y_{12}+E_2Y_{22} \qquad (2a)$$

From 1*a* and 2*a*, the input and transfer admittance may be derived and power relationships obtained. Deriving first the normalized input admittance $$y_{in}'=\frac{Y_{in}}{Y_0}=\frac{I}{E_1Y_0}=\frac{Y_{11}}{Y_0}-2\frac{\frac{Y_{12}^2}{Y_0^2}}{\frac{Y_{22}}{Y_0}} \qquad (7)$$

After substituting the equivalent for $Y_{11}$, $Y_{22}$ and $Y_{12}$, Equation 7 becomes $$y_{in}'=1+\frac{1}{1+(2k-1)\cos^2\theta}+J\frac{\sqrt{2}}{\tan\theta}\left[\frac{\sqrt{k}}{1+(2k-1)\cos^2\theta}-\frac{1}{\sqrt{k}}\right] \qquad (8)$$

It should be noted here that the source conductance 28 is included in the input admittance equation, and, if the input admittance of the ring is desired, it may be obtained by subtracting 1 from Equation 8:

$$y_{in}=y_{in}'-1 \qquad (9)$$

This is plotted in Figure 3.

The transfer admittance may be expressed by $$y_T=\frac{Y_T}{Y_0}=\frac{I}{E_2Y_0}=\frac{\frac{Y_{11}}{Y_0}\frac{Y_{22}}{Y_0}}{\frac{Y_{12}}{Y_0}}-2\frac{Y_{12}}{Y_0} \qquad (10)$$

and once again substituting the equivalent for $Y_{11}$, $Y_{22}$ and $Y_{12}$, 10 becomes $$y_T=\left(2+\frac{2}{k}\right)\cos\theta+J\sqrt{\frac{2}{k}}\sin\theta\left(2-\frac{1}{\tan^2\theta}\right) \qquad (11)$$

The power absorbed by the ring exclusive of that absorbed by the source conductance 28 may be expressed as $$P_{in}=|E_1|^2Re(Y_{in}) \qquad (12)$$

where $$Re(Y_{in})=\frac{1}{1+(2k-1)\cos^2\theta}$$

and $$|E_1|^2=\frac{I^2[1+(2k-1)\cos^2\theta]^2}{Y_0^2\left\{[2+(2k-1)\cos^2\theta]^2+\frac{2}{k\tan^2\theta}[k-1-(2k-1)\cos^2\theta]^2\right\}}$$

so that $$P_{in}=\frac{I^2[1+(2k-1)\cos^2\theta]}{Y_0\left\{[2+(2k-1)\cos^2\theta]^2+\frac{2}{k\tan^2\theta}[k-1-(2k-1)\cos^2\theta]^2\right\}} \qquad (13)$$

This power is maximum when $$\theta=\frac{\pi}{2}$$

which corresponds to the design center frequency of the ring and is equal to the maximum available power from the source or $$P_{in}(\theta=\pi/2)=\frac{I^2}{4Y_0} \qquad (13a)$$

By normalizing 13 with respect to 13*a* an expression is obtained showing the power loss when the frequency is other than at design center $$P=\frac{P_{in}(\theta=\pi/2)}{P_{in}}=\frac{[2+(2k-1)\cos^2\theta]^2+\frac{2}{k\tan^2\theta}[k-1-(2k-1)\cos^2\theta]^2}{4[1+(2k-1)\cos^2\theta]} \qquad (14)$$

Equation 14 defines a response curve for the wideband hybrid ring and in the subject application it is desirable that the bandwidth be maximum. Although an expression for bandwidth can be derived and differentiated with respect to $k$ to find the optimum value of $k$, it is easier here to differentiate $p$ with respect to $k$ for any given angle of $\theta$ and set the differential equation equal to zero to obtain the optimum $k$. Thus $$\frac{dp}{dk}=\frac{1}{4}\left\{\frac{[(1-\cos^2\theta)+2k\cos^2\theta]\frac{2}{\tan^2\theta}}{k^2}+\left[1+\frac{2}{k\tan^2\theta}\right]2\cos^2\theta\right\}=0 \qquad (15)$$

Solving 15 for $k$ $$k=1 \qquad (16)$$

A plot of the inverse of $$\frac{2}{p}$$

with $k=1$ is shown in Fig. 4 and the half power bandwidth is approximately 130°. Assuming a band center frequency of 680 megacycles this corresponds to a bandwidth of almost 1000 megacycles. It is perhaps intuitively obvious that the power absorbed by the ring is divided equally between the two load conductances 26 and 27; however, it can be shown by calculating the power at either of these points that this power division is independent of $k$ and $\theta$.

The voltage standing wave ratio may be obtained from the expression $$e=\frac{1+\left|\frac{1-y_{in}}{1+y_{in}}\right|}{1-\left|\frac{1-y_{in}}{1+y_{in}}\right|} \qquad (17)$$

After substituting the value of $Y(k=1)$ in the above Equation 17 becomes $$e=\frac{1+\sqrt{\frac{\cos^6\theta+\cos^4\theta}{\cos^6\theta-3\cos^4\theta+4}}}{1-\sqrt{\frac{\cos^6\theta+\cos^4\theta}{\cos^6\theta-3\cos^4\theta+4}}} \qquad (18)$$

While the preceding analysis was carried out for purely resistive terminations, parallel capacitance across load conductances 26 and 27 is invariably encountered in practice. This capacitance, which may be stray and unavoidable or may be deliberately added, is indicated by a capacitor 29 in parallel with the load 26 and a capacitor 31 in parallel with the load 27. To accommodate the parallel resistance-capacitance loads at terminals 2 and 3, $Y_{22}$ becomes $$Y_{22}=\frac{Y_0}{k}+2Y_1+2Y_{12}+Y$$

where $$Y=JB=J\omega C$$

and $$\frac{B}{Y_0}=b$$

When $Y_{22}$ is substituted in Equation 7 the normalized admittance for $k=1$ becomes $$y_{in}=g_{in}+J\left[\frac{\sqrt{2}}{\tan\theta}(g_{in}-1)-g_{in}b\right] \qquad (19)$$

where $$g_{in}=\frac{1}{\sin^2\theta\left[1+\left(\frac{\sqrt{2}}{\tan\theta}-b\right)\right]} \qquad (20)$$

Normalized input conductance and susceptance for the special case where $$b=0.428 \text{ at } \theta=\frac{\pi}{2}$$

has been plotted in Fig. 5. As might be expected the capacitive loading reduces the line lengths necessary for arms 11–14, but the graph also shows that the susceptance can be made small over a wideband if equal capacitance equivalent to $b=0.428$ at $$\theta=\frac{\pi}{2}$$

are also placed across terminals 1 and 4. Condensers 32 and 33, respectively, supply the added capacitance.

The response of this capacity-loaded ring can then be evaluated from the normalized input admittance, which becomes $$y_{in}=g_{in}+J(g_{in}-1)\left(\frac{\sqrt{2}}{\tan\theta}-b\right) \qquad (21)$$

where $g_{in}$ is defined by Equation 20 and $$b=0.428 \text{ at } \theta=\frac{\pi}{2}$$

Then the response curve as plotted in Figure 4 is obtained from $$p=\frac{(g_{in}+1)^2+(g_{in}-1)^2\left(\frac{\sqrt{2}}{\tan b}-b\right)}{4g_{in}} \qquad (22)$$

It will be noted in Fig. 5 that the addition of capacitor 32 (Fig. 1) "tunes out" the equivalent inductance 34 which arises from the impedance-transforming characteristics of the arms 11 and 14 acting on the capacitive reactance of condensers 29 and 31. The particular susceptance represented by capacitor 32 shifts the susceptance curve 36 up to the position of the dotted curve 37, which is tangent to the pure conductance line at $\theta=78°$. Between $\theta=55°$ and $\theta=85°$, the input admittance of the ring is composed almost entirely of conductance with practically no susceptance.

The angle $\theta$ may be understood as a direct measure of frequency simply by equating a particular angle $\theta$ to a particular frequency. For instance, if $\theta=78°$ for a frequency of 780 mc., the angle $\theta=55°$ corresponds to a frequency of 550 mc. and the angle $\theta=85°$ corresponds to a frequency of 850 mc. Therefore, for a hybrid ring adjusted to these frequencies, the admittance would be composed of practically pure conductance between the frequencies of 550 mc. and 850 mc., and the usable bandwidth would be even greater than the indicated 300 mc., since the small susceptance at $\theta=50°$ and $\theta=90°$, or even beyond, may have negligible effect on the operation. The usable bandwidth is not defined with exactness but is a matter of judgment, as is well-known to those skilled in the art.

Although this invention has been described in limited terms and related to specific embodiments, it will be obvious to those skilled in the art that modifications may be made therein within the scope of the invention as determined by the following claims.

What is claimed is:

1. A hybrid ring comprising first, second, third, and fourth pairs of two-wire transmission lines, said transmission lines being connected end to end to form a closed loop with the wires of one of said transmission lines being transposed to invert the polarity of signals passing therethrough; a first pair of input terminals at the junction of said first and fourth transmission lines; a second pair of input terminals at the junction of said second and third transmission lines; a source of electrical signals connected to said first pair of input terminals to energize said ring with a signal in a predetermined frequency band, each of said transmission lines being approximately a quarter wave long for frequencies in said band; a first pair of output terminals at the junction of said first and second transmission lines; a second pair of output terminals at the junction of said third and fourth transmission lines; a first load impedance connected between the terminals of said first pair of output terminals and comprising resistance and capacitance; a second load impedance connected between the terminals of said second pair of output terminals and comprising resistance and capacitance substantially equal respectively to the resistance and capacitance of said first impedance; and a capacitive reactance connected in parallel with said source between the terminals of said first pair of input terminals to cancel the effect of said capacitances in said load impedances thereby to make said hybrid ring operate over a broad band of frequencies.

2. The circuit of claim 1 in which the reactance of said capacitive reactance connected to said input terminals has substantially the same magnitude as a reactance of the capacitance of each of said impedances in said frequency band.

References Cited in the file of this patent

UNITED STATES PATENTS 2,436,828 Ring ------------------- Mar. 2, 1948